United States Patent [19]
Lee

[11] Patent Number: 5,019,735
[45] Date of Patent: May 28, 1991

[54] MOTOR CONSTRUCTION FOR AN ELECTRIC FAN

[76] Inventor: Jen J. Lee, No. 7, Alley 14, Lane 101, Shyue Fu Rd., San Ho Tsun, Ta Ya Hsiang, Taichung Hsien, Taiwan

[21] Appl. No.: 563,354

[22] Filed: Aug. 7, 1990

[51] Int. Cl.$^5$ ............................................. H02K 15/00
[52] U.S. Cl. .................................. 310/89; 310/42; 310/62; 310/64; 310/90; 310/91; 310/258
[58] Field of Search ............. 310/89, 62, 63, 64, 310/90, 91, 42, 261, 254, 258, 179

[56] References Cited

U.S. PATENT DOCUMENTS

| | | | |
|---|---|---|---|
| 1,886,683 | 11/1932 | Hueglin | 310/91 |
| 2,697,179 | 12/1954 | Wendel | 310/62 |
| 3,343,016 | 9/1967 | Lewis | 310/91 |
| 3,900,234 | 8/1975 | Roddy et al. | 310/90 |
| 4,288,712 | 9/1981 | Hagenlocher et al. | 310/91 |

*Primary Examiner*—R. Skudy
*Attorney, Agent, or Firm*—Leydig, Voit & Mayer

[57] ABSTRACT

A motor has a stator disposed between a casing and a cap. The casing has a ring and four frame members formed together. Four posts are formed on the cap. The stator has an induction coil and a rotor is rotatedly disposed in the center of the stator. A shaft is fixed to the center of the rotor. The casing, the stator and the cap are fixed together by four screws. The cap and the casing are opened so that the motor has an excellent heat dissipation rate.

1 Claim, 2 Drawing Sheets

MOTOR CONSTRUCTION FOR AN ELECTRIC FAN

BACKGROUND OF THE INVENTION

The present invention relates to a motor, and more particularly to a motor construction of an electric fan.

The motor is the primary part of the electric fan which generates heat during operation. Therefore, heat radiation and heat dissipation is one of the most important considerations when designing the motor. However, the motors are generally enclosed by caps which have only few holes formed therein for heat dissipation purposes. The heat dissipation rate is bad. In addition, the motor construction is complicate so that the cost is high.

The present invention has arisen to mitigate and/or obviate the afore-described disadvantages of the conventional motors for electric fans.

SUMMARY OF THE INVENTION

The primary objective of the present invention is to provide a motor construction for an electric fan which has a simple construction and has an excellent heat dissipation rate.

In accordance with one aspect of the invention, there is provided a motor which has a stator disposed between a casing and a cap. The casing has a ring and four frame members formed together. Four posts are formed on the cap. The stator has an induction coil and a rotor is rotatedly disposed in the center of the stator. A shaft is fixed to the center of the rotor. The casing, the stator and the cap are fixed together by four screws. The cap and the casing are opened so that the motor has an excellent heat dissipation rate.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
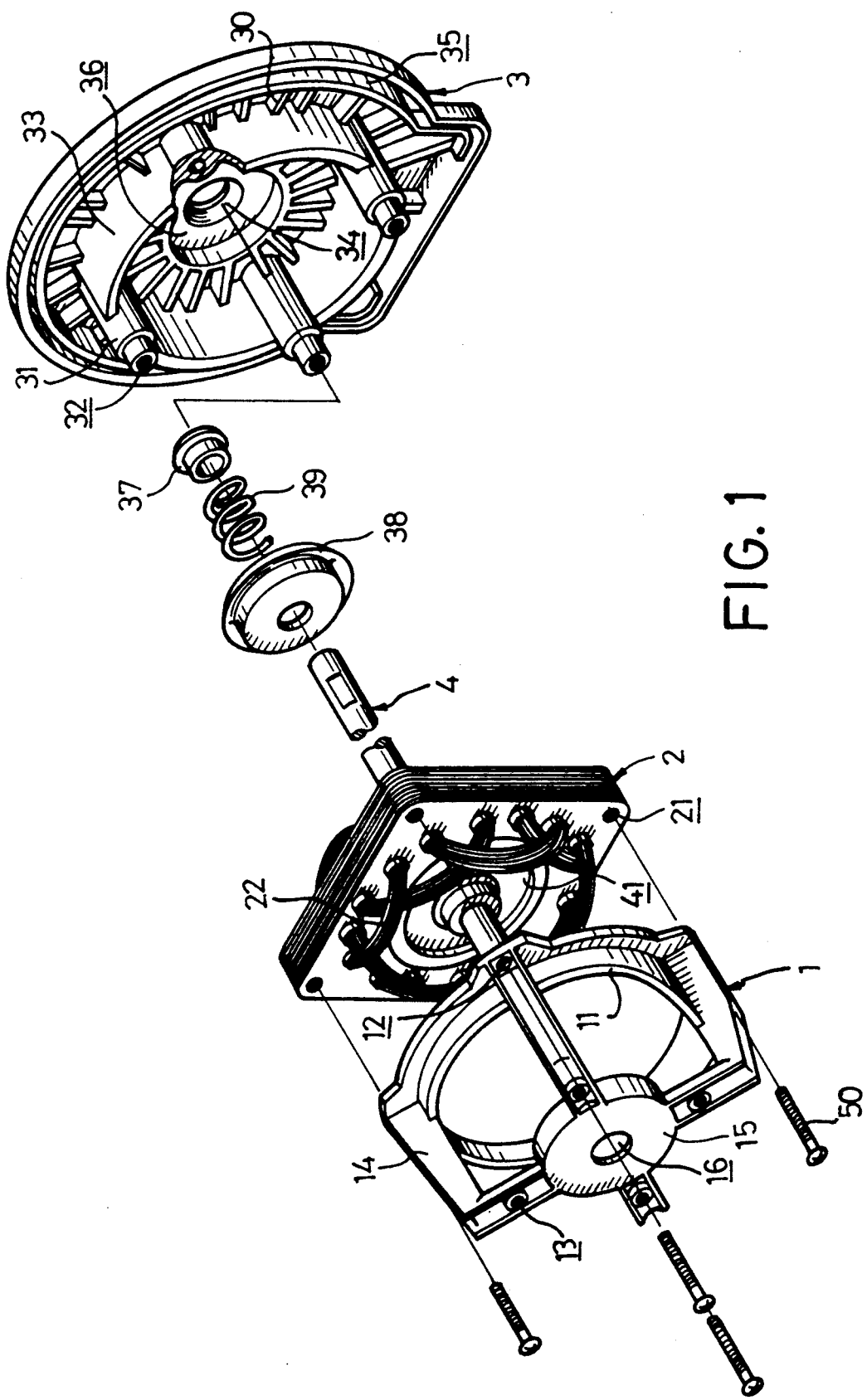
FIG. 1 is an exploded view of a motor construction in accordance with the present invention.

Referring to the drawings, the motor construction in accordance with the present invention comprises generally a stator 2 disposed between a casting 1 and a cap 3. The casing 1 which has an open structure includes a ring portion 11 and four equally spaced frame members 14 integrally formed together. The frame members 14 are substantially L-shaped. A disc 15 with a center hole 16 formed therein is integrally formed in a center portion of the frame member 14. A screw hole 12 is formed in a root portion of each frame member 14 and a screw hole 13 is formed in a front surface of each frame member 14.

The cap 3 is substantially circular and has a plurality of ribs 30 formed therein so as to form a mesh grid structure. Four equally spaced posts 31 are integrally formed on an annular wall 33 which is concentrically formed in a front and middle portion of the cap 3. A screw hole 32 is formed in a front end of each post 31. A center hole 34 is formed in the cap 3. A bearing 37 is force-fitted in the center hole 34. A groove 35 is formed in the perimeter of the cap 3 for receiving an annular edge of an outer shell (not shown). A circular recess 36 which is concentric to the center hole 34 is formed in the inner surface of the cap 3. A bearing 38 is received in the circular recess 36. A spring 39 is biased between the two bearings 37, 38.

Figure 2:
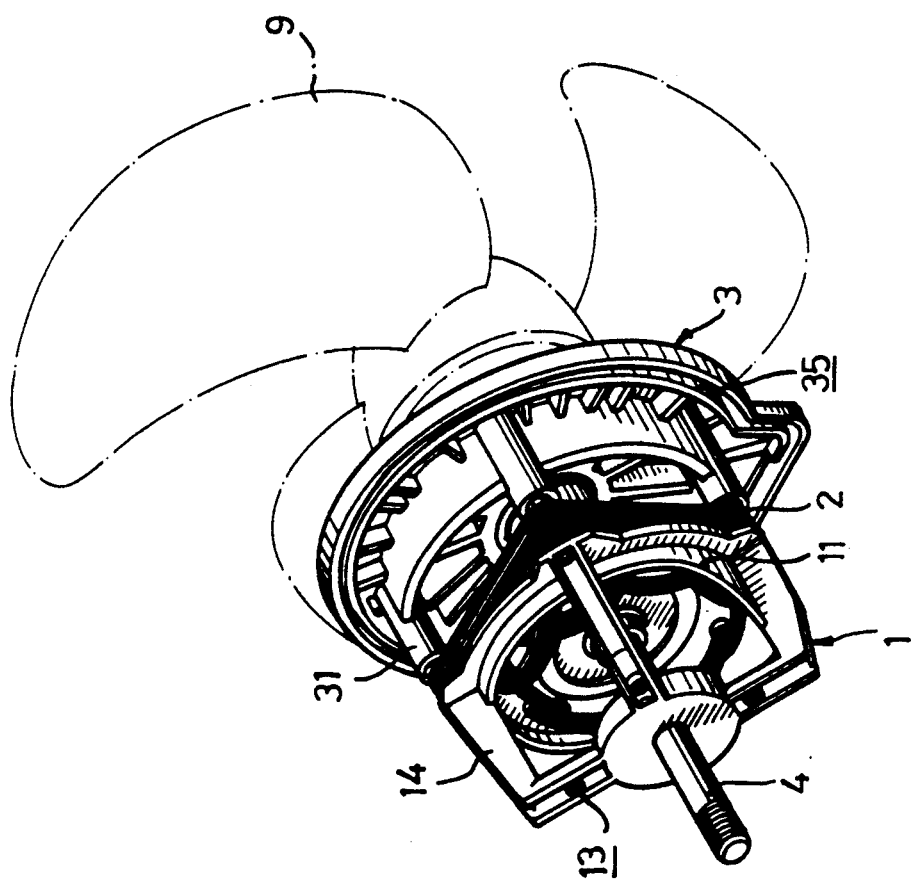
FIG. 2 is a perspective view of the motor construction.

An induction coil 22 is wound on the stator 2 which is substantially rectangular. An aperture 21 is formed in each corner area of the stator 2. A rotor 41 is rotatedly disposed in a center of the stator 2. A shaft 4 is vertically fixed to a center of the rotor 41. As shown in FIG. 2, when the casing 1, the stator 2 and the cap 3 are aligned, four screws 50 are threaded through the screw holes 12, passed through the apertures 21 and threaded through the screw holes 32 so that the casing 1, the stator 2 and the cap 3 can be easily fixed together. One end of the shaft 4 extends through the center hole 16 of the casing 1, and the other end extends through the bearings 37, 38 so that the shaft 4 is rotatedly supported by the bearings 37, 38. A fan blade 9 is fixed to the other end of the shaft 4 which extends through the bearings 37, 38. The spring 39 biases the bearings 37, 38 so that a force is exerted to the stator 2 and so that the stator 2 is stably retained between the casing 1 and the cap 3.

Accordingly, the motor construction in accordance with the present invention is simple. The stator 2 can be easily fixed between the casing 1 and the cap 3. The casing 1 has an open structure and the cap 3 has a mesh grid structure so that the heat dissipation rate of the motor is improved.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A motor construction comprising generally a stator disposed between a casing and a cap, said casing including a ring portion and four equally spaced frame members integrally formed together so that said casing has an open structure, a disc portion with a first center hole formed therein being integrally formed in a center and coupling portion of said frame members, a first screw hole being formed in a root portion of each said frame member; said cap having a plurality of ribs formed therein so as to form a mesh grid structure, four equally spaced posts being integrally formed on an annular wall which is substantially concentrically formed in a middle portion of said cap, a second screw hole being formed in a front end of each said post, a second center hole being formed in said cap, a bearing being force-fitted in said second center hole of said cap; induction coil being wound on said stator which has an aperture formed in each of four corner areas thereof, a rotor being rotatedly disposed in a center portion of said stator, a shaft being vertically fixed to a center portion of said rotor; said casing, said stator and said cap being fixed together by four screws which are threaded through said first screw holes of said casing, passed through said apertures of said stator and threaded through said second screw holes of said cap; one end of said shaft extending through said first center hole of said casing, and another end of said shaft which has a fan blade fixed thereto being rotatedly supported by said bearing; and said motor construction has an excellent heat dissipation rate because of said open structure of said casing and said mesh grid structure of said cap.

* * * * *